March 30, 1937.  C. THORREZ  2,075,675

NUT

Filed July 15, 1936

Inventor
C. Thorrez
By L. F. Kandreth
Attorney

Patented Mar. 30, 1937

2,075,675

UNITED STATES PATENT OFFICE 2,075,675

NUT

Camiel Thorrez, Jackson, Mich.

Application July 15, 1936, Serial No. 90,781

2 Claims. (Cl. 85—32)

This invention relates to a steel bar and clinch nut adapted to be made therefrom.

It is particularly aimed to provide an exceedingly simple and strong bar from which clinch nuts may be made of a shape to more readily penetrate openings in a sheet or the like, have portions to fill the openings, with the nut at eight faces having contact with the sheet and with the nut also having portions adapted to be clinched against the sheet.

The more specific objects and advantages will become apparent from a consideration of the description following taken in connection with accompanying drawing illustrating an operative embodiment.

In said drawing:—

Figure 1:
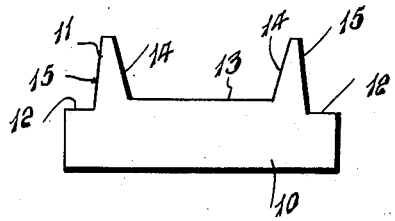
Figure 1 is an end elevation of the bar stock.
Figure 2:
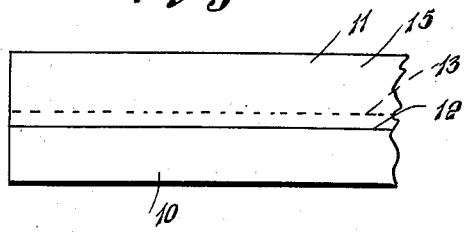
Figure 2 is a side elevation thereof.
Figure 3:
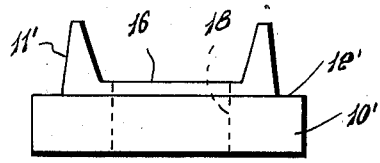
Figure 3 is an end elevation of a nut made from the said bar stock.
Figure 4:
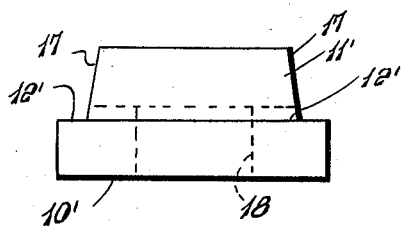
Figure 4 is a view made from the said bar stock taken at a right angle to Figure 3.
Figure 5:
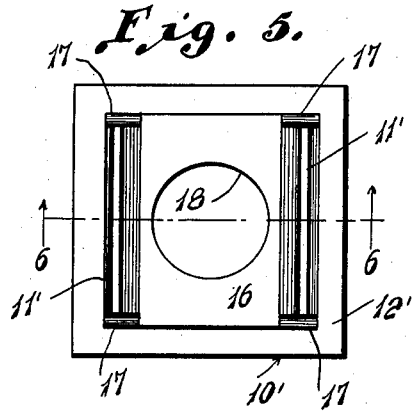
Figure 5 is a plan view of the nut.
Figure 6:
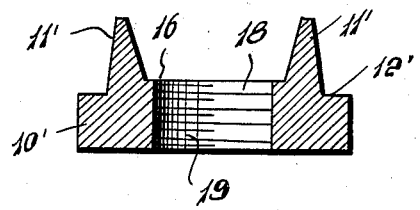
Figure 6 is a vertical sectional view taken on the line 6—6 of Figure 5.

Referring specifically to the drawing wherein like reference characters designate like or similar parts and first the Figures 1 and 2, a steel bar is shown at 10 having a pair of longitudinal ribs 11 rising therefrom and symmetrically with respect to the center and the side edges. Said ribs are inset from the said edges and extend from surfaces or planes 12 on the outside thereof while the metal between the ribs is thicker and extends above said plane 12 as at 13. The inner surfaces of the ribs are inclined as at 14 while the outer surfaces 15 are also inclined but preferably to a lesser degree.

From the stock bar shown in Figures 1 and 2, nuts as disclosed in the remaining figures are adapted to be manufactured. Such stock is adapted to be cut into lengths. The lengths provide bodies 10' generally rectangular, having raised central portions 16 and a planar surface 12' continuous about the same. It will be understood that the nut is machined to provide such planar surface 12' adjacent the ends of the ribs here designated 11' and it will be further noted that the ends of such ribs are inclined or bevelled as at 17, preferably on the same angle as the outer surfaces 15 of the stock. A central opening is provided through the nut as at 18, having screw threads 19 therein, for engagement with the screw threads on bolt shanks.

Figure 7:
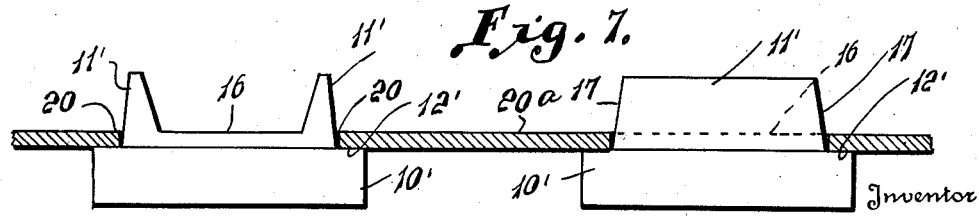
Figure 7 is a view illustrating a pair of the nuts engaged with a sheet, preparatory to being clinched thereto.
Figure 8:
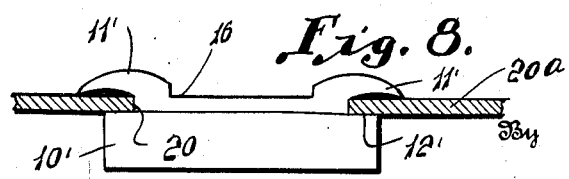
Figure 8 is a section showing one of the nuts clinched to the sheet.

The nuts may be used in plurality as disclosed in Figure 7, having the ribs 11' and the raised portions 16 extending through openings 19 in a sheet or plate 20, the raised portions 16 snugly fitting the openings 19 whereby eight surfaces of the nuts and plate 20 are in contact. Preferably the raised portion 16 is of the same height as the sheet or plate 20 as shown in Figure 7 and 8 and the ribs 11' are adapted to be clinched over the adjacent edges of the sheet or plate as shown in Figure 8, the clinching of the ribs or prongs 11' being effected in a punch press, for example.

Various changes may be resorted to provided they fall within the spirit and scope of the invention.

I claim as my invention:—

1. A one-piece nut of the class described having a body, a raised portion spaced from all sides thereof, two spaced elongated prongs extending from said raised portion in parallelism at opposite sides thereof and adapted to be clinched over an engaged element, said prongs having their outer ends and outer side surfaces bevelled for better entry into an opening.

2. A one-piece nut of the class described having a body, a raised portion spaced from all sides thereof, two spaced elongated prongs extending from said raised portion in parallelism at opposite sides thereof and adapted to be clinched over an engaged element, said prongs having their outer ends and outer side surfaces bevelled for better entry into an opening, and the inner surfaces of said prongs being bevelled.

CAMIEL THORREZ.